(12) United States Patent  
Reynolds et al.

(10) Patent No.: US 8,391,446 B2
(45) Date of Patent: *Mar. 5, 2013

(54) METHOD AND SYSTEM FOR ROUTING CALLS BASED ON A LANGUAGE PREFERENCE

(75) Inventors: Douglas F. Reynolds, Austin, TX (US); Jeffrey L. Scruggs, Round Rock, TX (US)

(73) Assignee: AT&T Labs, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/414,055

(22) Filed: Mar. 7, 2012

(65) Prior Publication Data

US 2012/0163563 A1 Jun. 28, 2012

Related U.S. Application Data

(63) Continuation of application No. 13/078,399, filed on Apr. 1, 2011, now Pat. No. 8,155,279, which is a continuation of application No. 12/268,213, filed on Nov. 10, 2008, now Pat. No. 7,940,898, which is a continuation of application No. 11/724,431, filed on (Continued)

(51) Int. Cl.
*H04M 1/64* (2006.01)
*H04M 3/50* (2006.01)

(52) U.S. Cl. ............ 379/88.05; 379/88.06; 379/265.01; 379/265.02

(58) Field of Classification Search ............... 379/88.05, 379/88.06, 88.12, 88.18, 207.02, 211.01, 379/211.02, 221.08, 265.01, 265.02, 265.12

See application file for complete search history.

(56) References Cited

U.S. PATENT DOCUMENTS

| | | | |
|---|---|---|---|
| 5,375,164 | A | 12/1994 | Jennings |
| 5,388,146 | A | 2/1995 | Morduch et al. |
| 5,440,615 | A | 8/1995 | Caccuro et al. |
| 5,794,218 | A | 8/1998 | Jennings et al. |
| 5,841,852 | A | 11/1998 | He |
| 5,914,951 | A | 6/1999 | Bentley et al. |
| 5,946,387 | A | 8/1999 | Miloslavsky |
| 6,055,305 | A | 4/2000 | Norman et al. |
| 6,069,939 | A | 5/2000 | Fung et al. |
| 6,097,806 | A | 8/2000 | Baker et al. |
| 6,154,527 | A | 11/2000 | Porter et al. |
| 6,185,290 | B1 | 2/2001 | Shaffer et al. |
| 6,205,215 | B1 | 3/2001 | Dombakly |
| 6,240,170 | B1 | 5/2001 | Shaffer et al. |
| 6,473,505 | B1 | 10/2002 | Khuc et al. |

(Continued)

*Primary Examiner* — Harry Hong
(74) *Attorney, Agent, or Firm* — Greenblum & Bernstein, P.L.C.

(57) ABSTRACT

A method that processes and conditionally routes a call. The method includes receiving a call from a caller, determining a telephone number of the caller, and determining if the telephone number of the caller is a telephone number assigned to a specific individual. The method also includes accessing an electronic database to determine a stored language preference of the specific individual when the telephone number of the caller is determined to be assigned to a specific individual. The method further includes routing the call to a predetermined destination based on the stored language preference of the specific individual in the electronic database, and routing the call to a first default destination when the telephone number of the caller is determined to not be assigned to a specific individual.

20 Claims, 7 Drawing Sheets

Related U.S. Application Data

Mar. 15, 2007, now Pat. No. 7,450,695, which is a continuation of application No. 11/156,366, filed on Jun. 17, 2005, now Pat. No. 7,209,549, which is a continuation of application No. 10/051,377, filed on Jan. 18, 2002, now Pat. No. 6,925,155.

U.S. PATENT DOCUMENTS

| | | | |
|---|---|---|---|
| 6,535,596 B1 | 3/2003 | Frey et al. | |
| 6,574,323 B1 | 6/2003 | Manuel et al. | |
| 6,597,765 B1 | 7/2003 | Ksiazek | |
| 6,798,876 B1 | 9/2004 | Bala | |
| 6,925,155 B2 | 8/2005 | Reynolds et al. | |
| 7,209,549 B2 | 4/2007 | Reynolds et al. | |
| 7,450,695 B2 | 11/2008 | Reynolds et al. | |
| 7,940,898 B2 | 5/2011 | Reynolds et al. | |
| 8,155,279 B2 * | 4/2012 | Reynolds et al. | 379/88.05 |

* cited by examiner

Fig. 3

| | 146 Language Preference Indicator | 147 Preferred Language | 148 Routing Information |
|---|---|---|---|
| 142 | ..... | ..... | ..... |
| 143 | 1 | English | ..... |
| 144 | 2 | Spanish | ..... |
| 145 | ..... | ..... | ..... |

| | 155 Telephone Number | 156 Standard Information | 157 Language Preference Indicator |
|---|---|---|---|
| 151 | ..... | ..... | ..... |
| 152 | 012-345-6789 | ..... | 1 |
| 153 | 123-456-7890 | ..... | 2 |
| 154 | ..... | ..... | ..... |

METHOD AND SYSTEM FOR ROUTING CALLS BASED ON A LANGUAGE PREFERENCE

RELATED APPLICATIONS

The present patent document is a continuation of U.S. patent application Ser. No. 13/078,399 (now U.S. Pat. No. 8,155,279), filed Apr. 1, 2011, which is a continuation of U.S. patent application Ser. No. 12/268,213 (now U.S. Pat. No. 7,940,898), filed on Nov. 10, 2008, which is a continuation of U.S. patent application Ser. No. 11/724,431 (now U.S. Pat. No. 7,450,695), filed on Mar. 15, 2007, which is a continuation of U.S. patent application Ser. No. 11/156,366 (now U.S. Pat. No. 7,209,549) filed Jun. 17, 2005, which is a continuation of U.S. patent application Ser. No. 10/051,377 (now U.S. Pat. No. 6,925,155), filed Jan. 18, 2002, the entirety of each of which are hereby incorporated by reference.

TECHNICAL FIELD

The present invention relates generally to telecommunications call processing and more particularly to call routing and language preference features.

BACKGROUND

Various types of telecommunications services that are available to customers require the customer to verbally communicate with a person or with an automated system in order for the customer to utilize the service. For example, the customer may be asked to respond to a series of audible questions or prompts in order for a telecommunications service to be provided to the customer. The audible questions or prompts can be transmitted to the customer by a person, such as an operator, or by an automated system, and can be transmitted in any number of languages. The customer, who may speak any number of languages, may be asked to respond with verbal or spoken answers to the questions or prompts. In order for the telecommunications service to be effectively provided to the customer, it is important that the customer be able to communicate in the language that is spoken by the person or that is implemented by the automated system and that the person or automated system be able to communicate in the language that is spoken by the customer.

In an effort to ensure that the customer can effectively communicate with the person or the automated system, various systems have been developed that allow for different languages to be used for such communications. In some of these systems, the user's language preference is stored and accessed in an effort to ensure that the customer and the person or automated system can communicate with one another. However, these systems generally have multiple shortcomings. Among other things, these systems suffer from a lack of centralized storage of a user's language preference and a lack of effective and efficient retrial and access of the user's language preference. Also, these systems are not designed for use with an advanced intelligent network (AIN) type of telecommunications system, which utilizes triggered queries to facilitate the retrieval and transmission of information between network elements.

U.S. Pat. No. 5,841,852 describes a system in which a user's language preference is stored in a database. The language preference is retrieved by the originating switch as soon as the user initiates protocol for a dial tone, and then the language preference is transmitted through the telephone network along with a telephone call. This system is inefficient in that it always retrieves a language preference, even when it is not needed for the current telephone call. Also, this system retrieves the language preference at the first stage of the call, long before it may be needed, and then transmits the language preference along with the telephone call. Accordingly, this system does not incorporate centralized storage of a user's language preference and does not effectively and efficiently retrieve and access the user's language preference. In addition, this system is not designed for use with an AIN.

A system that overcomes the deficiencies noted above is needed.

BRIEF DESCRIPTION OF THE DRAWINGS

FIG. 3 is a portion of a database of a preferred embodiment.

FIG. 4 is a portion of a database of a preferred embodiment.

DETAILED DESCRIPTION OF THE DRAWINGS

Figure 1:
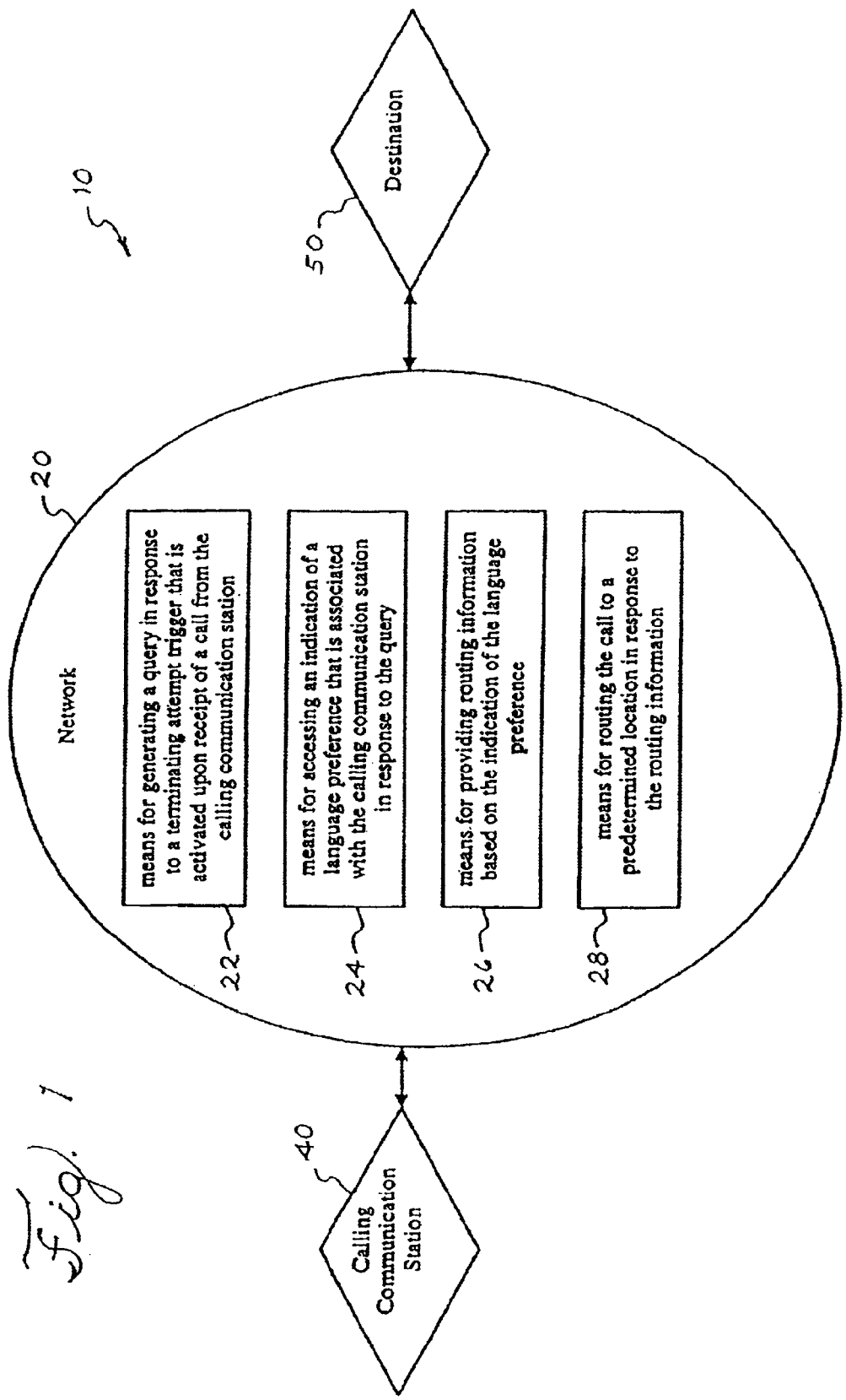
FIG. 1 is a block diagram of a system for processing a telephone call of a preferred embodiment.

By way of example, FIG. 1 depicts a system 10 of a preferred embodiment. The system 10 comprises a network 20 that is coupled with a calling communication station 40, and a destination 50. The phrase "coupled with," as used herein, means coupled either directly or indirectly via one or more intervening elements. The network 20 preferably comprises means for generating a query in response to a terminating attempt trigger that is activated upon receipt of a call from the calling communication station 22, means for accessing an indication of a language preference that is associated with the calling communication station in response to the query 24, means for providing routing information based on the indication of the language preference 26, and means for routing the call to a predetermined location in response to the routing information 28.

The system 10 is preferably implemented in a telecommunications network as known by those skilled in the art. Alternatively, the system 10 can be implemented on a computer network or any other network that is adapted to store and retrieve information. Each of the means 22, 24, 26, 28 described above is preferably implemented through the use of computer readable program code written in any suitable programming language and implemented on an analog or digital computer utilizing any suitable operating system. Alternatively, each of the means 22, 24, 26, 28 can be implemented through the use of hardware in the form of a hardwired computer, an integrated circuit, or a combination of hardware and computer readable program. The calling communication station 40 preferably comprises an analog telephone. Alternatively, the calling communication station 40 can comprise any suitable communication station, including wireless, PCN, ISDN, computer based, or any other form of communication station adapted for use in the present embodiments. The destination 50 preferably comprises an automated interactive voice response (IVR) unit implemented using a telecommunications network element. Alternatively, the destination 50 can comprise a telephone number, a person, a call center, or any form of telecommunications network element.

The system 10 enables a calling party at the calling communication station 40 to be efficiently and effectively connected with a destination that implements a language that is preferred by the calling party. The system 10 enables the calling party's language preference to be associated with the calling telephone number, centrally stored, and efficiently accessed. When the calling party uses the calling communication station 40 to place a call to a predetermined telephone number, the system 10 utilizes a terminating attempt trigger and a query to determine the calling party's language preference and routes the call to an appropriate destination where the calling party's preferred language is implemented.

Figure 2:
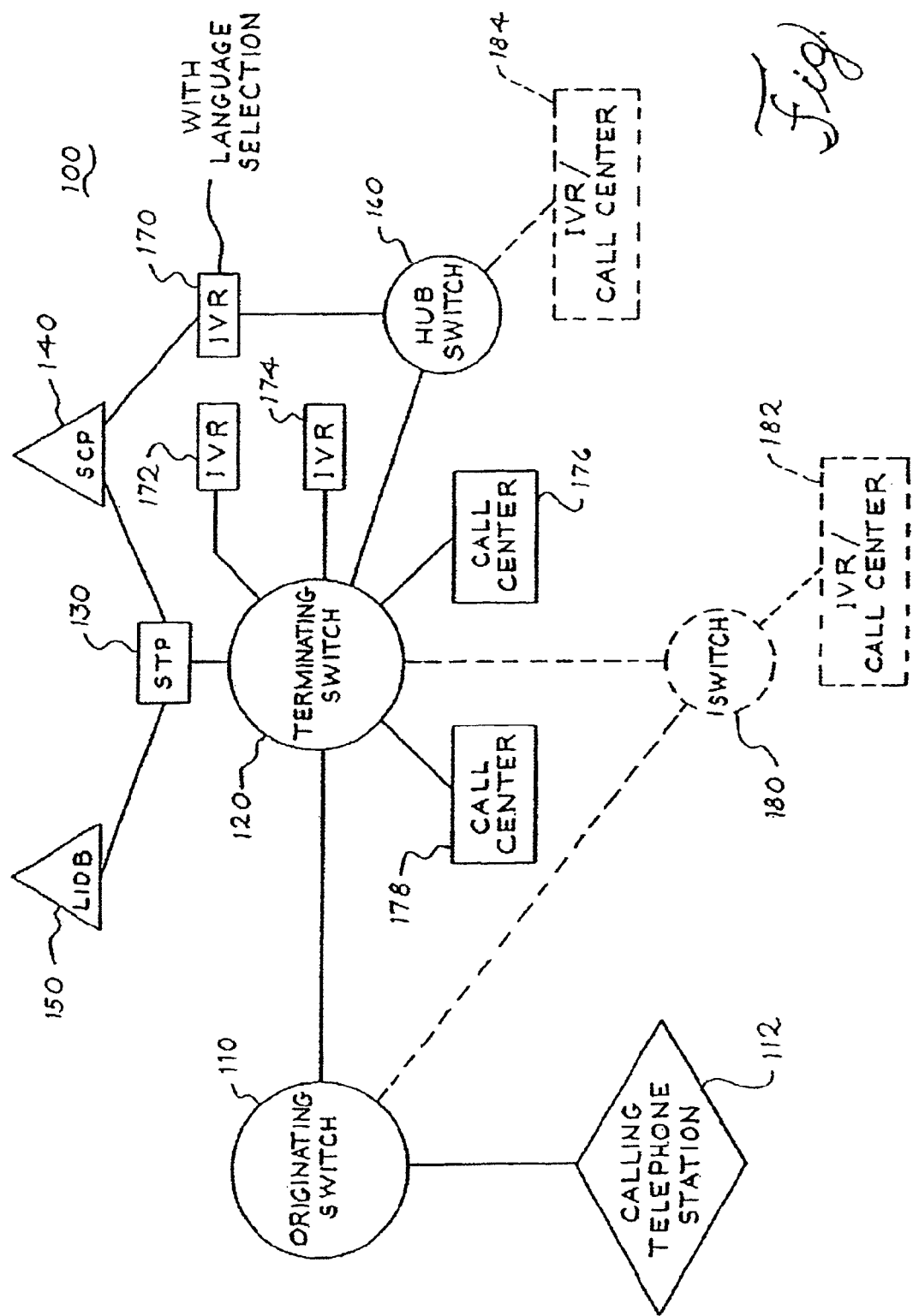
FIG. 2 is a more detailed block diagram of the system depicted in FIG. 1.

By way of further example, FIG. 2 depicts a preferred embodiment of the system described above. The system 100 comprises an originating switch 110, a calling telephone station 112, a terminating switch 120, a signal transfer point (STP) 130, a service control point (SCP) 140, a line information database (LIDB) 150, a hub switch 160, interactive voice response (IVR) systems 170, 172, 174, and call centers 176, 178. This system can be implemented with intelligent network components, commonly referred to as advanced intelligent network (AIN) components, which can implement computer readable program code, and are commercially available from vendors such as Lucent Technologies. Alternatively, this system can be implemented using various types of network elements. The network components preferably transmit information in accordance with a signaling protocol such as Signaling System 7 (SS7), Internet protocols, or other such protocols as known by those skilled in the art. Vendors of AIN components typically have a preferred programming language and operating platform as known by those skilled in the art. Alternatively, this system can be implemented using a Unix platform, an NT server, or other suitable computer systems.

The originating switch 110 can comprise an AIN switch, such as a service switching point (SSP), or a non-AIN switch, such as a central office switch. The originating switch 110 is preferably coupled with the terminating switch 120 and the calling telephone station 112. The originating switch 110 enables a calling party at calling telephone station 112 to place calls to and receive calls from other telephone stations and network elements. The originating switch 110 can route calls to different network elements, including the terminating switch 120, and preferably communicates with the terminating switch 120 and other network elements in accordance with a signaling protocol such as Signaling System 7 (SS7), Internet protocols, or other such protocols.

The calling telephone station 112 preferably comprises an analog telephone set. Alternatively, the calling telephone station 112 can comprise wireless, PCN, and ISDN telephone sets, as well as a computer, facsimile, or any other form of communication station.

The terminating switch 120 can comprise an AIN switch, such as a service switching point (SSP), or a non-AIN switch, such as a central office switch. The terminating switch 120 is preferably coupled with the originating switch 110, the STP 130, the hub switch 160, VRs 172, 174, and call centers 176, 178. The terminating switch 120 enables calls to be placed from and received by IVRs 172, 174 and call centers 176, 178. The terminating switch also enables calls to be routed within the network. In a preferred embodiment, the terminating switch 120 is operative to generate terminating attempt triggers (TATs) and to transmit queries in response to the TATs. For example, the terminating switch can generate a query and transmit it to the SCP 10 via the STP 130. The queries preferably enable the terminating switch 120 to request the return of certain information. The terminating switch 120 preferably communicates with the other network elements in accordance with a signaling protocol such as SS7, internet protocols, or other such protocols. The terminating switch 120 can receive information, such as routing information, from the SCP 140 and can route calls to other network elements based upon the routing information.

The STP 130 preferably comprises a network switch that transmits signaling commands within the network. For example, the STP 130 can transmit queries and responses to queries between the terminating switch 120 and the SCP 140. The STP 130 can also transmit queries and responses to queries between the SCP 140 and the LIDB 150. The STP 130 is preferably coupled with the terminating switch 120, the SCP 140, and the LIDB 150.

The SCP 140 preferably comprises an AIN element that can store information, receive queries, analyze information included within the queries, perform database or other searches, and transmit information to and receive information from other network elements. The SCP 140 preferably includes a set of predetermined logic rules that enable it to perform these and other actions. For example, the SCP 140 can receive a query that is generated by the terminating switch 120 and can transmit information to the LIDB 150 that enables the LIDB 150 to perform a database search or lookup. The SCP 140 can also receive information from the LIDB 150, analyze that information, and provide information to the terminating switch 120 in response to its analysis.

For example, the SCP 140 can store the table 141 shown in FIG. 3, which it can use to provide routing information to the terminating switch 120 in response to information that the SCP 140 receives from the LIDB 150. The table 141 preferably includes a plurality of line entries 142, 143, 144, 145 that are used to associate language preference indicators, such as those that are stored in the LIDB as described below, with a language preference and routing information associated with the language preferences. The entries 142 and 145 are intended to denote that additional line entries can be included in the table 141 beyond what is shown in this example. Each line entry 142, 143, 144, 145 preferably includes a language preference indicator field 146, which can be populated with a language preference indicator, as described in more detail below, and a routing information field 148, which can be populated with routing information. The SCP 140 can utilize the table 141 to retrieve the routing information that is associated with a language preference indicator, as described in more detail below. The routing information preferably includes information that enables a switch to route the call to the appropriate location that implements the language associated with the language preference indicator. For example, assuming that the IVR 172 implements English and the IVR 174 implements Spanish, in accordance with the examples of language preference indicators shown in FIGS. 3 and 4, the routing information associated with the language preference indicator 1 directs a switch to route the call to IVR 172, while the routing information associated with the language preference indicator 2 directs a switch to route the call to IVR 174. In an alternative embodiment, the table 141 can include a language preference field 147, but such a field is not required and is shown primarily for demonstrations purposes in this embodiment.

The SCP 140 can also communicate with the IVR 170 to facilitate the transmission of information and data between the IVR 170 and the LIDB 150, as described in more detail below. The SCP 140 is preferably implemented by a combination of hardware and software. Alternatively a suitable processor can be used in place of the SCP 140.

The LIDB 150 preferably comprises a database, as known to those skilled in the art. The LIDB 150 preferably includes predetermined logic rules that enable it to perform analyses and to perform other actions such as database searches and lookups. The LIDB 150 can perform such analyses, searches, and lookups in response to requests for information that can be transmitted from other network elements, such as the SCP 140. The LIDB 150 is preferably implemented by a combination of hardware and software. In an alternative embodiment, any suitable database can be used in place of the LIDB 150. In a further alternative embodiment, a suitable processor can be used in place of the logic used in the LIDB 150.

In a preferred embodiment, a portion of the data stored in the LIDB 150 is shown in FIG. 4. As shown in FIG. 4, the LIDB 150 preferably includes a plurality of line records 151, 152, 153, 154 that are each dedicated to a telephone number. The line records 151 and 154 are intended to denote that additional line records can be included in the LIDS beyond what is shown in this example. Each line record 151, 152, 153, 154 preferably includes a telephone number field 155, one or more fields that include standard information 156 that is commonly stored in the LIDS, and a language preference field 157. The language preference field 157 is not typically included in the LIDB, but can be added for purposes of use with the present embodiments. The language preference field 157 enables a numeric value to be stored in the field to signify a language preference that is associated with the telephone number of that entry. For example, the entry 1 shown in the language preference field 157 of line record 152 can be used to signify that a first language is the preferred language associated with telephone number 012-345-6789, while the entry 2 shown in the language preference field 157 of line record 153 can be used to signify that a second language is the preferred language associated with the telephone number 123-456-7890. Additional entries, such as 3, 4, 5, etc., can be used to signify that additional languages are preferred for additional line records. These examples should not be viewed as limiting in any way, as other entries can be used in the language preference field to signify a particular language preference so long as the entries associated with the different language preferences are distinct from one another. For example, in alternative embodiments letters such as A, B, C, etc., binary digits such as 00, 01, 10, 11, combinations of letters and numbers, and any other type of character can be used in the language preference entries. In addition, the language preference field can be of any size such that it can accommodate a single or multiple characters and the like.

The hub switch 160 preferably comprises an AIN switch, such as an SSP, but can also comprise a non-AIN switch, such as a central office switch and the like. The hub switch 160 is preferably coupled with the terminating switch 120 and IVR system 170. The hub switch 160 enables calls to be placed from and received by IVR system 170 and also enables information and data to be transmitted from and received by the IVR system 170. The terminating switch also enables calls to be routed within the network. In a preferred embodiment, the hub switch 160 is preferably connected to with the IVR 170, while the originating and terminating switches 110, 120 are not directly connected to the IVR 170. In this way, the hub switch 160 serves as a centralized location for the IVR 170.

The IVR systems 170, 172, 174 are preferably implemented using a network element such as a service node (SN), an intelligent peripheral (IP), or the like. The IVR systems 170, 172, 174 can generate announcements that can be transmitted to the calling telephone station 112. The IVR systems 170, 172, 174 can also receive information transmitted from the calling telephone station 112, can analyze the information, and can perform various actions in response to the analysis. In this embodiment, the IVR 170 preferably implements a first language, such as English, while the IVR 172 preferably implements a second language, such as Spanish. Additional IVRs can be used in conjunction with the present embodiments to implement additional languages. In the preferred embodiment, each IVR preferably implements a separate language and each IVR preferably has a unique routing identifier, such as a telephone number, that enables calls to be routed to the individual IVRs. The IVR systems 170, 172, 174 preferably include predetermined logic rules that enable them to perform analyses and to perform other actions. The IVR systems 170, 172, 174 are preferably implemented by a combination of hardware and software. Alternatively a suitable processor can be used in place of the IVR systems 170, 172, 174. Alternatively a processor in a Unix platform, an NT server, or other suitable computer system can be used in place of the IVR systems 170, 172, 174. The IVRs can each be implemented on a separated platform or multiple IVRs can be implemented on the same platform. The IVR system 170 preferably also comprises a further set of logic rules that enables it to perform additional functions related to the selection of a language preference, as described in more detail below. Specifically, the IVR system 170 is operative to receive information transmitted by from the calling telephone station 112 and facilitate the storage of that information as a language preference indicator in LIDB 150.

Call centers 176, 178 preferably comprise operator assistance centers where operators are able to converse with callers in different languages such that the operators can provide or deliver various services to calling parties. Each call center can have people stationed at the call center that speak a certain language and the call center can have a unique routing identifier, such as a telephone number, that enables calls to be routed to the individual call center. Alternatively, each call center can have people stationed at the call center that speak different languages and the call center can have multiple routing identifiers, such as telephone numbers, that are associated with the different people such that calls can be routed to a specific individual or groups of people that speak a callers preferred language.

Switch 180 is shown in dashed lines to represent one or more additional switches that can be coupled with the present system and that can also be coupled to one or more additional IVR systems or call centers, as represented by the element 182. Also, the IVR/Call center 184 is depicted as being coupled with the hub switch 160. These elements, which are shown in phantom or dashed lines, are merely depicted as examples of additional elements that can be utilized in conjunction with the system. The elements are like those described above, and their use in the present system and methods are discussed in more detail below.

Figure 5:
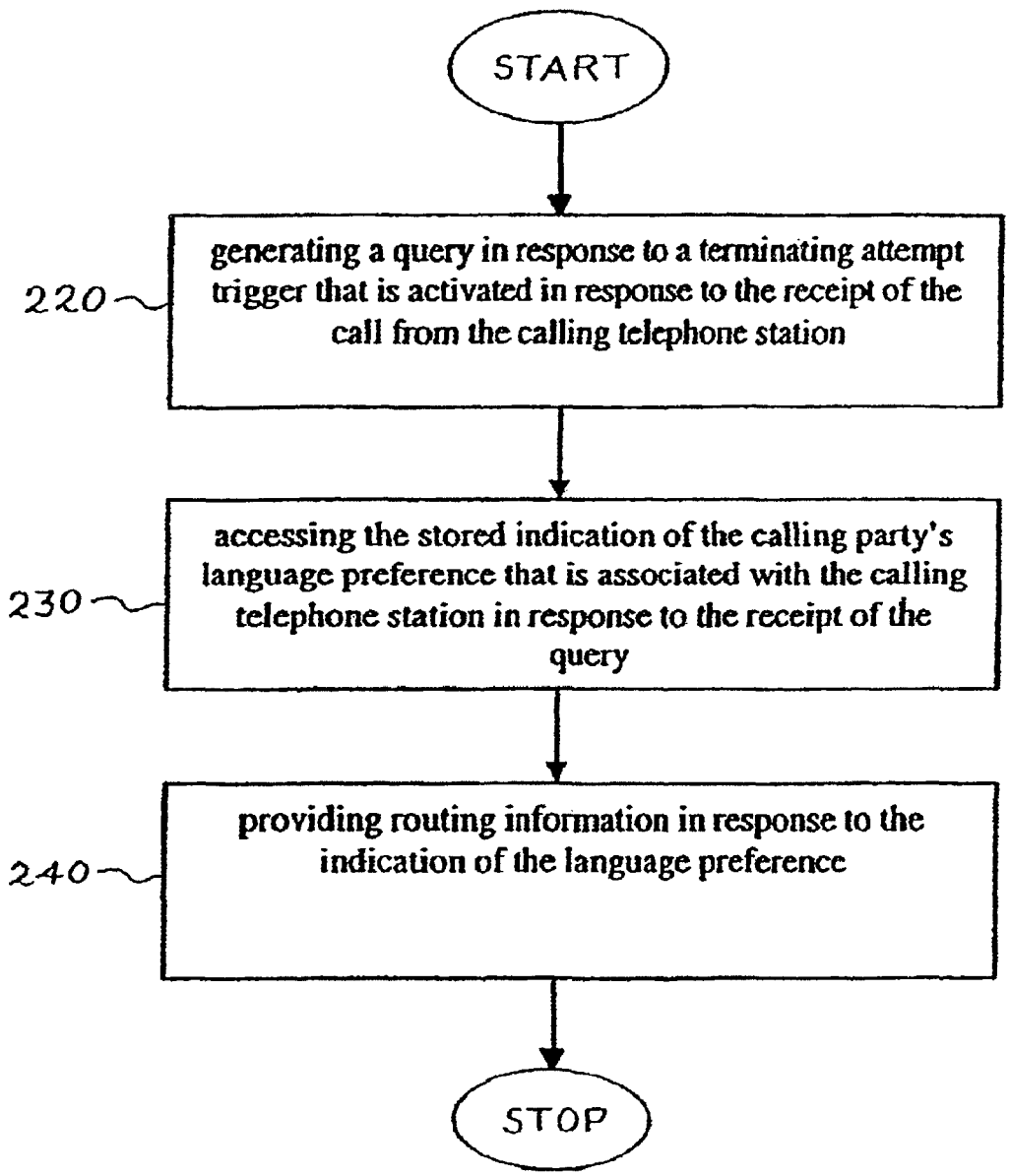
FIG. 5 is a flow chart of a method for processing a telephone call of a first preferred embodiment.

The system depicted in FIG. 2 can be utilized to implement the method 200 depicted in FIG. 5. For purposes of illustration, assume that a calling party at the calling telephone station 112 (FIG. 2) has previously selected Spanish as that person's preferred language. Also assume that the telephone number associated with the calling telephone station 112 is 123-456-7890 and that an indication of the calling party's language preference has been associated with the telephone number of the calling telephone station and stored in LIDB 150 by including a 2 in the language preference indicator field 157 of line 153, as shown in FIG. 4. When the calling party dials a telephone number or other code in an attempt to gain access to a service, the method described herein is initiated.

The calling party can initiate the method by dialing a telephone number such as a 1-800-NPA-NXXX number or by dialing an abbreviated code such as *76. Alternatively, the calling party can dial, or otherwise initiate the call in a variety of ways. In response to the calling party dialing the number, the call is routed from the originating switch 110 to the terminating switch 120 that is associated with the dialed number. After the call is routed to the terminating switch 120, the method described below is initiated to process the call.

The method 200 of processing the call from the calling telephone station 110 generally comprises the acts of: (I) generating a query in response to a terminating attempt trigger that is activated in response to the receipt of the call from the calling telephone station (act 220, FIG. 5); (ii) accessing the stored indication of the calling party's language preference that is associated with the calling telephone station in response to the receipt of the query (act 230); and providing routing information in response to the indication of the language preference (act 240). Each of these acts is described in more detail below.

The act of generating a query in response to a terminating attempt trigger that is activated in response to the receipt of the call from the calling telephone station (act 220, FIG. 5), preferably comprises generating the query using the terminating switch 120, as described above in conjunction with FIG. 2, and transmitting the query from the terminating switch 120 to the SCP 140. In this preferred embodiment, the terminating attempt trigger (TAT) is automatically activated within the terminating switch 120 upon receipt of the call. In response to the TAT, the query is also automatically generated by the terminating switch 120 and is automatically transmitted to the SCP 140 The query preferably contains the calling telephone number, in this example 123-456-7890, and an indication that the query is requesting the language preference associated with the calling telephone number.

Figure 6:
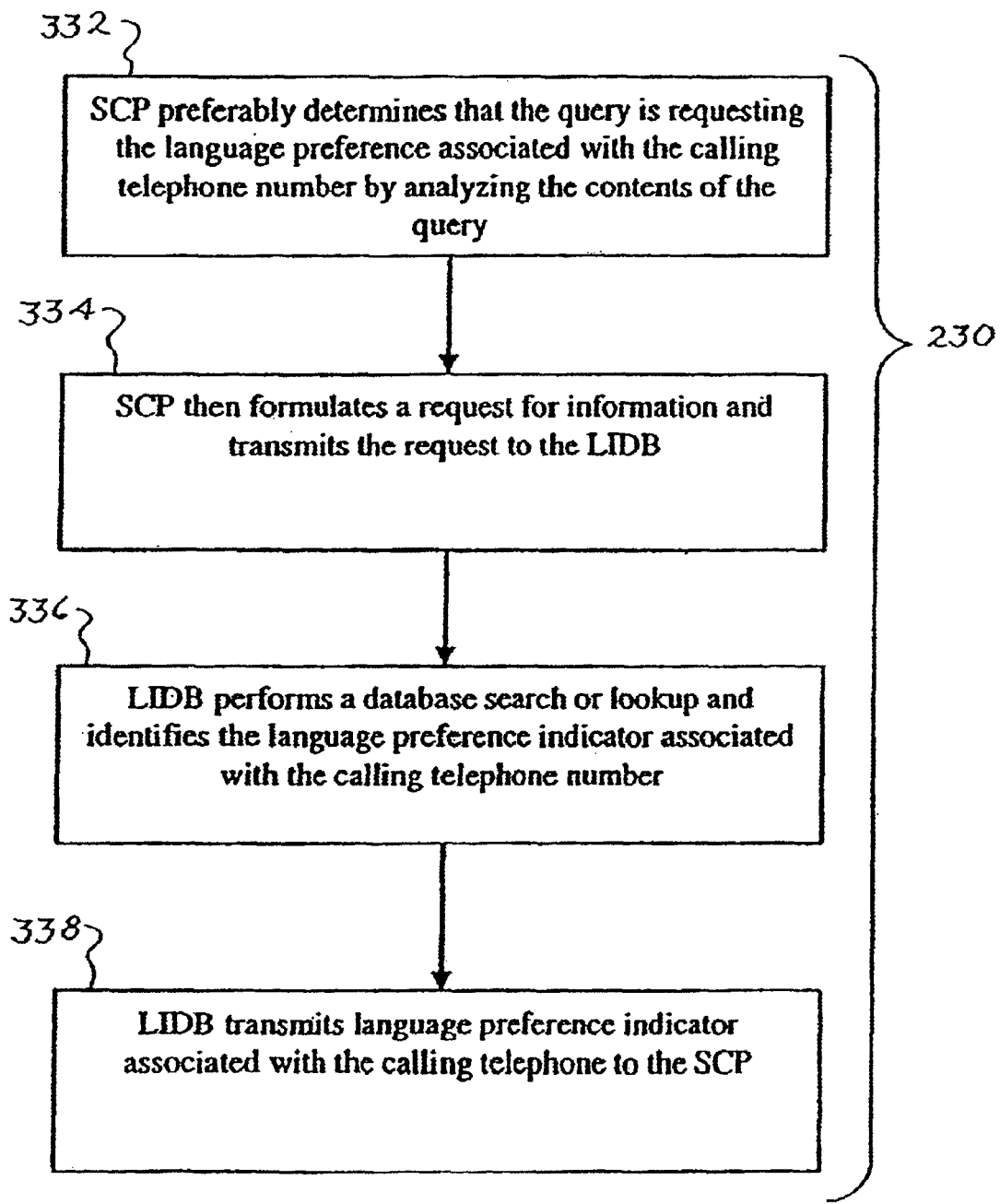
FIG. 6 is a more detailed flow chart of a portion of the method depicted in FIG. 5.

The act of accessing the stored indication of the calling party's language preference that is associated with the calling telephone station in response to the receipt of the query (act 230, FIG. 5) preferably comprises the following acts as depicted in FIG. 6. Upon receipt of the query, the SCP 140 preferably determines that the query is requesting the language preference associated with the calling telephone number by analyzing the contents of the query (act 332, FIG. 6). The SCP 140 then formulates a request for information and transmits the request to the LIDB 150 (act 334). The request preferably comprises the calling telephone number and an indication that the language preference associated with the calling telephone number is being requested. Upon receipt of the request, the LIDB 150 performs a database search or lookup and identifies the language preference indicator associated with the calling telephone number (act 336). The LIDB 150 can, for example, retrieve the language preference indicator 2, which corresponds to the telephone number 123-456-7890, as depicted in FIG. 4. After the LIDB 150 has retrieved the language preference indicator associated with the calling telephone number it can transmit the indicator to the SCP 140 (act 338).

Figure 7:
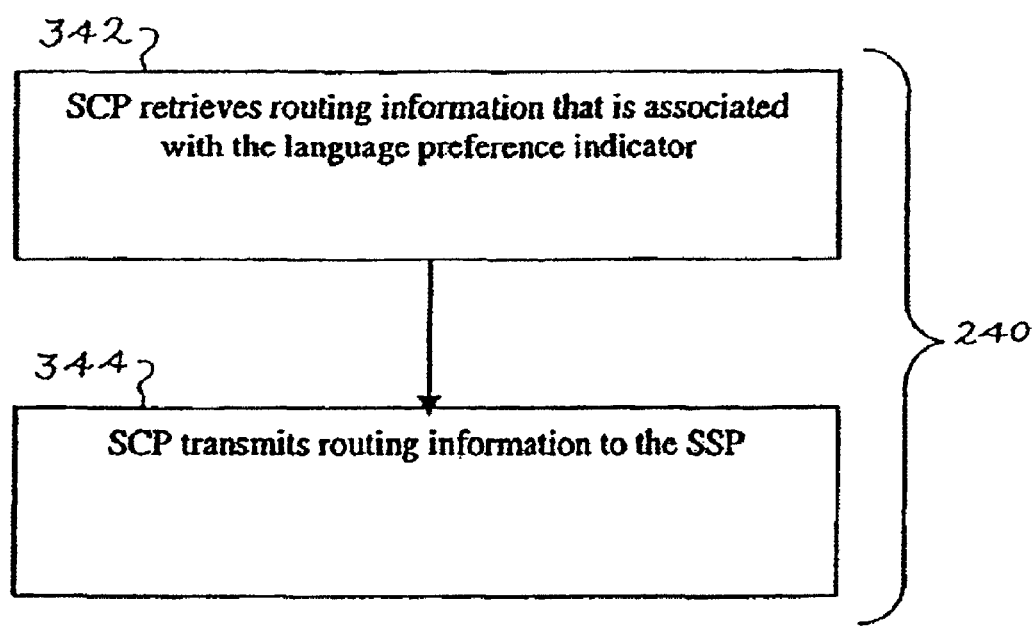
FIG. 7 is a more detailed flow chart of a portion of the method depicted in FIG. 5.

The act of providing routing information in response to the indication of the language preference (act 240, FIG. 5) preferably comprises the following acts, as depicted in FIG. 7. Upon receipt of the language preference indicator associated with the calling telephone number from the LIDB 150, the SCP 140 retrieves the appropriate routing information that is associated with the language preference indicator (act 342). This routing information enables the call to be routed to a destination that implements the preferred language. For example, the SCP 140 can use the language preference indicator to search a table, such as the one depicted in FIG. 3, to retrieve the routing information that is associated with the language preference indicator. In this example, the SCP 140 can retrieve the routing information associated with the language preference indicator 2, as shown in line 144 (FIG. 3) of the table 141. This routing information preferably facilitates the routing of the call to IVR 174 (FIG. 2), as IVR 174 implements the Spanish language, which is the language that is associated with the language preference indicator 2. The search can be performed in accordance with the logic that is stored within the SCP 140, as described above. The SCP 140 then transmits the routing information to the terminating switch 120 (act 344). These exemplary actions can be altered such that routing information can be retrieved and provided that enables a call to be routed to any number of IVRs or call centers that implement any number of different languages, so long as the destination implements the calling party's preferred language.

In addition to the acts described above, the following acts can also be implemented in conjunction with the embodiments described herein. When the terminating switch 120 receives the routing information from the SCP 140, the terminating switch 120 routes the call to a predetermined destination that implements the preferred language, based upon the routing information. The terminating switch 120 can route the call to virtually any other network element. For example, the terminating switch 120 can route the call to any one of the IVRs or call centers shown in FIG. 2. Accordingly, the terminating switch 120 can route the call to the IVRs 172, 174 and the call centers 176, 178 that are coupled with the terminating switch 120. The terminating switch 120 can also route the call to the other IVRs and call centers 170, 182, 184, which are not coupled with the terminating switch 120, by routing the call to another switch, such as hub switch 160 or switch 180. These exemplary actions can be altered to such a call can be routed to any number of IVRs or call centers that implement any number of different languages, so long as the destination implements the calling party's preferred language.

Prior to act 320 (FIG. 5), the information can be stored in the language preference indicator field 157 (FIG. 4) of the LIDB 150. The information can be stored automatically in the LIDB 150 upon the receipt of certain information that can be transmitted by a customer from, for example, calling telephone station 112. The customer can provide information or instructions in the form of voice commands or through the use of dual tone multi frequency (DTMF) or other input that can be used to automatically store a language preference indicator in the LIDB 150. Alternatively, the customer could transmit information via a computer or some other medium that can be used to automatically store a language preference indicator in the LIDB 150. In a further alternative embodiment, information can be receive from an employee, such as a customer service representative, that can be used to automatically store a language preference indicator in the LIDB 150.

Figure 8:
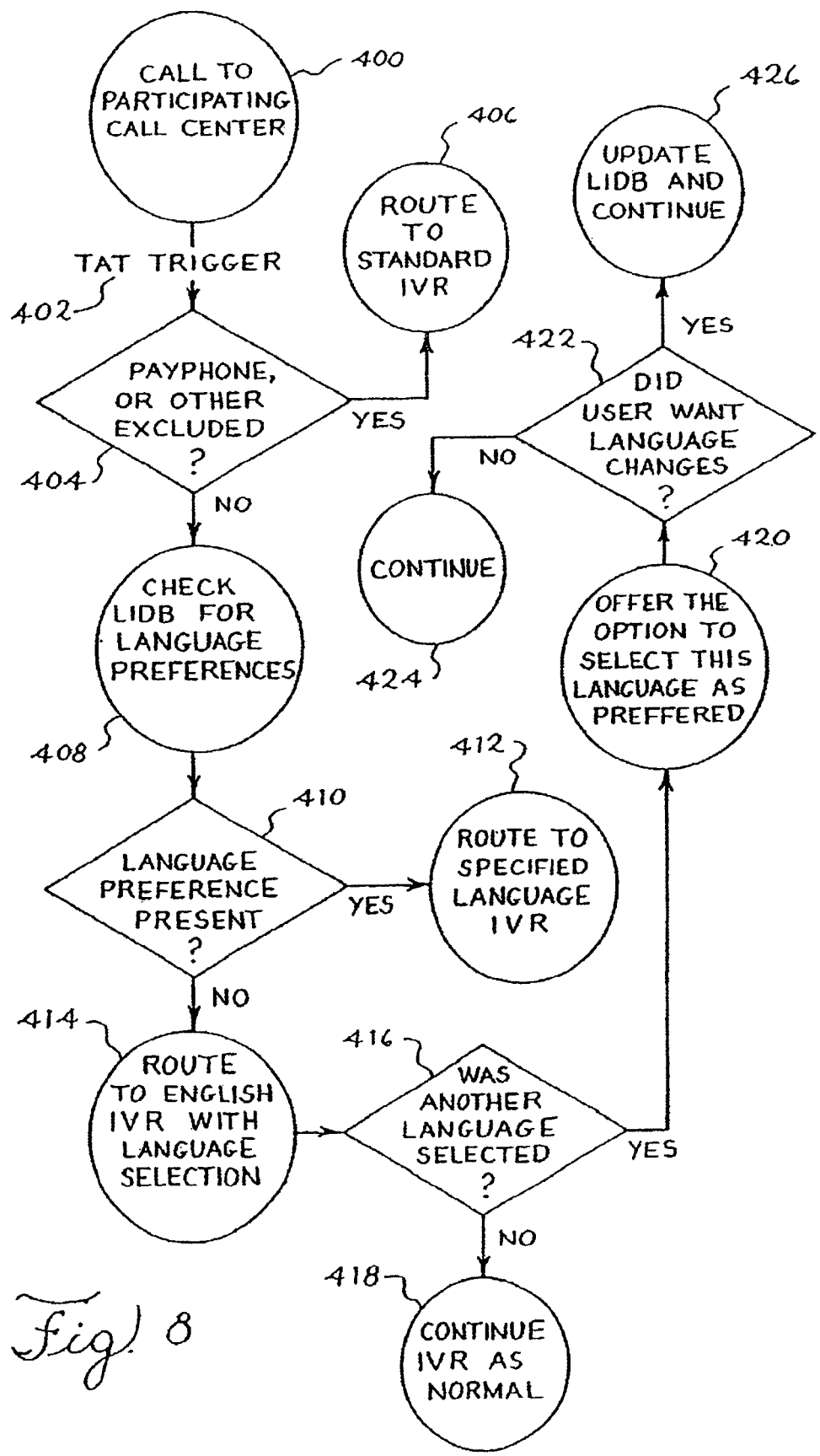
FIG. 8 is a flow chart of a method for processing a telephone call of a second preferred embodiment.

Referring now to FIG. 8, some additional details of different embodiments are depicted. Items 400 and 402 depict that a call has been placed by the calling party and a TAT trigger has resulted in the transmission of a query, as described above in more detail. Item 404 depicts that the calling telephone number is analyzed to determine whether it is associated with a payphone or another type of telephone that would be excluded from use with the present embodiments. This analysis can be performed, for example, by the SCP 140 (FIG. 2). A payphone is preferably excluded from use with the present embodiments because it is used by multiple different callers such that one language preference is not readily associated with the payphone. In alternative embodiments, a payphone may not be excluded when a default language is associated with the payphone based upon certain criteria, such as the payphone's physical or geographical location. If it is determined that the calling telephone number is associated with a telephone that is excluded from use with the present embodiments, the call can be routed to an IVR that implements a default language, such as English, as shown in item 406. In the embodiment depicted in FIG. 2, the IVR 172 preferably implements the English language and would be the preferred destination for routing the call. If it is determined that the calling telephone number is not associated with a telephone that is excluded, the process can proceed to items 408-412, which depict that the processes that are described in more detail above can be implemented if there is a language preference associated with the calling telephone number.

Items 414-426 depict actions that can be implemented if there is no language preference associated with the calling telephone number such that the processes described above cannot be implemented. Item 414 depicts that if no language preference is associated with the calling telephone number, the call can be routed to an IVR that implements a default language, such as English, and that includes logic that enables the IVR to facilitate a users selection of a preferred language. For example, in the embodiment depicted in FIG. 2, the IVR 170 preferably implements the English language and includes logic that enables it to facilitate a user's selection of a preferred language. Accordingly, IVR 170 would be the preferred destination for routing the call. Item 416 represents that the calling party can be given voice prompts that enable the calling party to select a language that is the same as or that differs from the default language. This can be done by transmitting announcements to the calling party in various languages and requesting that the calling party provide some form of response, such as DTMF or voice response, to signify their language preference.

Item 418 depicts that if the calling party did not select a language other than the default language, the call is continued as normal. Item 420 depicts that if the calling party selected a language other than the default language, the calling party is given the option of selecting this language as their preferred language. This can be done by transmitting announcements to the calling party and requesting that the calling party provide some form of response, such as DTMF or voice response, to signify their desire to select a language preference.

Items 422 and 424 depict that if the calling party does not wish to designate a preferred language, the call is processed as normal. Items 422 and 426 depict that if the calling party chose to select a language as their preferred language, that preference can be included in a database. This can be accomplished by transmitting information from the IVR 170 to a database, such as LIDB 150, where the information can be stored as a language preference indicator, such as those shown in FIG. 4. In some instances the SCP 140 can be used to facilitate the transfer of information to a database such as the LIDB 150.

The present embodiments provide an efficient and effect method and system for routing calls to predetermined destinations to facilitate communication in a customer's preferred language. The present embodiments allow for an indication of a customer's language preference to be stored in some fashion and also allow for that indication to be accessed when the customer places a call that may require communications in a specific language. The indication of the customer's language preference can be accessed upon receipt of the call and appropriate information can be retrieved that enables the call to be routed to a destination to facilitate communication in a customers preferred language. The indication of the customer's language preference can be stored at a centralized location and it can be accessed efficiently only when it is needed. Also, the present embodiments facilitate the use of advanced intelligent network components in storing and retrieving the customer's language preference, as well as in routing a call to a destination to facilitate communication in a customers preferred language.

It is to be understood that a wide range of changes and modifications to the embodiments described above will be apparent to those skilled in the art and are contemplated. It is therefore intended that the foregoing detailed description be regarded as illustrative rather than limiting, and that it be understood that it is the following claims, including all equivalents, that are intended to define the spirit and scope of the invention.

We claim:

1. A method for processing a call, the method comprising:
   receiving a call from a caller over a communication network;
   determining a telephone number of the caller;
   determining if the telephone number of the caller is a telephone number assigned to a specific individual;
   accessing an electronic database to determine a stored language preference of the specific individual when the telephone number of the caller is determined to be assigned to a specific individual, the specific individual's stored language preference being associated with the caller's telephone number in the electronic database;
   routing the call to a predetermined destination based on the stored language preference of the specific individual in the electronic database when the telephone number of the caller is determined to be assigned to the specific individual; and
   routing the call to a first default destination when the telephone number of the caller is determined to not be assigned to a specific individual.

2. The method of claim 1, further comprising:
   routing the call to a second default destination when the telephone number of the caller is determined to be assigned to the specific individual and the electronic database does not include a stored language preference of the specific individual.

3. The method of claim 2, further comprising:
   determining the first default destination based upon a geographical location of the telephone number of the caller.

4. The method of claim 3,
   wherein the first default destination is an automated interactive voice response unit that implements a default language based upon the geographical location of the telephone number of the caller.

5. The method of claim 1,
   wherein the second default destination is a call center that determines the language of the caller and responds to the caller in at least one of a plurality of different languages.

6. The method of claim 1,
   wherein the first default destination is an automated interactive voice response unit that implements a default language.

7. The method of claim 1,
   wherein the first default destination is an automated interactive voice response unit that prompts the caller to select a language preference for a current call.

8. The method of claim 7,
   wherein the automated interactive voice response unit further prompts the caller to designate a language preference to be stored in the electronic database for future calls.

9. The method of claim 1,
wherein the predetermined destination is an automated interactive voice response unit that implements a language associated with the stored language preference of the specific individual.

10. The method of claim 1,
wherein the predetermined destination is a call center having an operator that can converse with the caller in the stored language preference of the specific individual.

11. The method of claim 1,
wherein a caller's stored language preference is entered into the electronic database by a caller using voice commands.

12. The method of claim 1,
wherein a caller's stored language preference is entered into the electronic database by a caller using a dual tone multi frequency input.

13. The method of claim 1,
wherein a caller's stored language preference is entered into the electronic database by a caller using a computer.

14. The method of claim 1,
wherein a caller's stored language preference is entered into the electronic database by a customer service representative at a call center.

15. A server for processing a call, the server comprising:
a receiver for receiving a call from a caller over a communication network;
a processor for determining a telephone number of the caller, and for determining if the telephone number of the caller is a telephone number assigned to a specific individual;
an electronic database that is accessed by the processor to determine a stored language preference of the specific individual when the telephone number of the caller is determined to be assigned to a specific individual, the specific individual's stored language preference being associated with the caller's telephone number in the electronic database; and
a router for routing the call to a predetermined destination based on the stored language preference of the specific individual in the electronic database when the telephone number of the caller is determined to be assigned to the specific individual, and for routing the call to a first default destination when the telephone number of the caller is determined to not be assigned to a specific individual.

16. The server of claims 15,
wherein the router routes the call to a second default destination when the telephone number of the caller is determined to be assigned to the specific individual and the electronic database does not include a stored language preference of the specific individual.

17. The server of claim 15,
wherein the first predetermined destination is an automated interactive voice response unit that implements a language associated with the stored language preference of the specific individual.

18. A non-transitory computer-readable storage medium including a computer-executable set of instructions for processing a call, comprising:
a receiving segment for receiving a call from a caller over a communication network;
a first determining segment for determining a telephone number of the caller;
a second determining segment for determining if the telephone number of the caller is a telephone number assigned to a specific individual;
an accessing segment for accessing an electronic database to determine a stored language preference of the specific individual when the telephone number of the caller is determined to be assigned to a specific individual, the specific individual's stored language preference being associated with the caller's telephone number in the electronic database;
a first routing segment for routing the call to a predetermined destination based on the stored language preference of the specific individual in the electronic database when the telephone number of the caller is determined to be assigned to the specific individual; and
a second routing segment for routing the call to a first default destination when the telephone number is determined to not be assigned to a specific individual.

19. The medium of claim 18, further comprising:
a second default destination routing segment for routing the call to a second default destination when the telephone number of the caller is determined to be assigned to the specific individual and the electronic database does not include a stored language preference of the specific individual.

20. The medium of claim 18,
wherein the predetermined destination is an automated interactive voice response unit that implements a language associated with the stored language preference of the specific individual.

* * * * *